(12) United States Patent
Lee (10) Patent No.: US 12,083,365 B2
(45) Date of Patent: Sep. 10, 2024

(54) EMERGENCY ANTI-GAS KIT

(71) Applicant: PINOSTORY CO., LTD., Seoul (KR)

(72) Inventor: Myung Won Lee, Seoul (KR)

(73) Assignee: PINOSTORY CO., LTD., Seoul (KR)

( * ) Notice: Subject to any disclaimer, the term of this patent is extended or adjusted under 35 U.S.C. 154(b) by 934 days.

(21) Appl. No.: 17/051,347

(22) PCT Filed: Apr. 16, 2019

(86) PCT No.: PCT/KR2019/004562
§ 371 (c)(1),
(2) Date: Oct. 28, 2020

(87) PCT Pub. No.: WO2019/212168
PCT Pub. Date: Nov. 7, 2019

(65) Prior Publication Data
US 2021/0093904 A1    Apr. 1, 2021

(30) Foreign Application Priority Data

Apr. 30, 2018 (KR) .......................... 10-2018-0049788

(51) Int. Cl.
*A62B 23/02* (2006.01)
*B32B 5/26* (2006.01)
(Continued)

(52) U.S. Cl.
CPC ................ *A62B 23/02* (2013.01); *B32B 5/26* (2013.01); *B32B 9/007* (2013.01); *B32B 17/067* (2013.01)

(58) Field of Classification Search
CPC ........... A62B 23/02; A62B 18/08; B32B 5/26; B32B 9/007; B32B 17/067;
(Continued)

(56) References Cited

U.S. PATENT DOCUMENTS

| 4,688,567 A | 8/1987 | Kikuchi et al. |
| 5,186,165 A | 2/1993 | Swann |

(Continued)

FOREIGN PATENT DOCUMENTS

| CN | 203677778 U | 7/2014 |
| CN | 206049589 U | 3/2017 |

(Continued)

OTHER PUBLICATIONS

Translation of KR20140042760A; 2014.*
Translation of KR200363628A1; 2003.*
Translation of WO-2010023370-A1; 2010.*

*Primary Examiner* — Victoria Murphy
(74) *Attorney, Agent, or Firm* — NKL Law; Jae Youn Kim (57) ABSTRACT

Proposed is an emergency anti-gas kit for achieving an effect of minimizing the occurrence of casualties by being easily carried, thereby enabling the quick use thereof in an emergency, such as a fire. A respiratory system adhering part is formed on one side of a main body part and enables the respiratory part of a user to adhere thereto. An activated carbon layer, a non-woven fabric layer, and a water tube for receiving water are provided in the main body part. A cutting member is provided in the main body part and enables the water received in the water tube to be leaked by an external pressing reaction and absorbed to the non-woven fabric layer. Air flow holes are formed on the upper and lower surfaces of the main body part and enable air to flow.

7 Claims, 7 Drawing Sheets

(51) Int. Cl.
   *B32B 9/00* (2006.01)
   *B32B 17/06* (2006.01)
(58) Field of Classification Search
   CPC ..... B32B 2571/00; B32B 3/263; B32B 5/022; B32B 2307/724; B32B 2535/00; B32B 3/08; B32B 9/045; B32B 9/047; B32B 27/12; B32B 2305/20; B32B 2307/7242
   See application file for complete search history.

(56) References Cited

U.S. PATENT DOCUMENTS

| | | | |
|---|---|---|---|
| 5,315,987 A | | 5/1994 | Swann |
| 2003/0136411 A1* | | 7/2003 | Hsieh ............... A62B 17/04 |
| | | | 128/206.25 |
| 2004/0144255 A1* | | 7/2004 | Lersch ............... B01D 39/1623 |
| | | | 96/69 |

FOREIGN PATENT DOCUMENTS

| | | | | |
|---|---|---|---|---|
| CN | 106983969 A | | 7/2017 | |
| CN | 206355461 U | | 7/2017 | |
| JP | 62106778 A | | 5/1987 | |
| JP | 07098073 B2 | | 10/1995 | |
| JP | 10305107 A | | 11/1998 | |
| JP | 2001178836 A | | 7/2001 | |
| KR | 200363628 A1 | * | 10/2004 | |
| KR | 10-2012-0066702 A | | 6/2012 | |
| KR | 10-2014-0042760 A | | 4/2014 | |
| KR | 20140042760 A | * | 4/2014 | |
| KR | 10-2017-0050479 A | | 5/2017 | |
| KR | 10-2017-0103197 A | | 9/2017 | |
| KR | 10-2017-0105907 A | | 9/2017 | |
| WO | WO-2010023370 A1 | * | 3/2010 | ........... A62B 23/025 |

* cited by examiner

EMERGENCY ANTI-GAS KIT

TECHNICAL FIELD

The present disclosure relates to an emergency anti-gas kit and, more particularly, to an emergency anti-gas kit allowing a user to escape in an emergency, such as a fire, while minimizing damage caused by toxic gas.

BACKGROUND ART

In general, in a place, such as a subway station, a public building, and a large shopping mall, in which a great number of people gather, complete preparations for a fire and toxic gas are required.

That is, an exit for evacuation in an emergency, fire-fighting equipment able to put out fires, and guidance lights in preparation for power failure must be provided. In particular, emergency gas masks must be provided in order to prevent suffocation caused by toxic gas.

However, most places, except for public facilities, such as a subway station, are not provided with gas masks. Even in the case that gas masks are provided, it may be difficult to rapidly find gas masks when toxic gas is generated by a sudden fire.

In addition, it may be difficult to rapidly put on a gas mask in an emergency in which an extremely rapid action is required.

Therefore, there has been a demand for a gas mask that is easy to use and may enable a user to rapidly escape from a fire area, thereby being substantially helpful to save life.

DISCLOSURE

Technical Problem

Accordingly, the present disclosure has been made keeping in mind the above problems occurring in the prior art, and an objective of the present disclosure is to provide an emergency anti-gas kit that is easy to carry and use and has a wet structure able to substantially protect the respiratory system of a user from toxic gas, so that the user may safely escape from a fire area.

Technical Solution

In order to accomplish the above objective, the present disclosure may provide an emergency anti-gas kit including: a body having a respiratory organ contact portion allowing a respiratory portion of a user to be in close contact therewith; an active carbon layer, a nonwoven fabric layer, and a water tube provided in the body, the water tube containing water; and pin or blade-shaped cutting members allowing the water contained in the water tube to be discharged and absorbed to the nonwoven fabric layer due to external pressurization. Air holes are formed in top and bottom surfaces of the body to allow air to flow therethrough.

Advantageous Effects

The anti-gas kit according to the present disclosure may be easily carried and be rapidly used in an emergency, such as a fire, so that wet gas filtration may be performed using the water tube to effectively block toxic gas from entering the respiratory system, thereby minimizing casualties.

MODE FOR INVENTION

Hereinafter, a specific embodiment of the present disclosure will be described in detail with reference to the accompanying drawings.

First, the configuration of an emergency anti-gas kit according to a first embodiment of the present disclosure will be described with reference to FIGS. 1 to 4.

In the anti-gas kit according to the present embodiment, a respiratory organ contact portion 11 with which the respiratory portion of a user may come into contact is provided in a portion of a body 10 made of a synthetic resin. In the body 10, an active carbon layer 20, a nonwoven fabric layer 30, and a water tube 40 in which water is contained are sequentially provided. In a receptacle of the water tube 40, cutting members 50 having the shape of pins or blades are provided, such that water contained in the water tube 40 may be discharged and absorbed to the nonwoven fabric layer 30 due to external pressurization.

Figure 1:
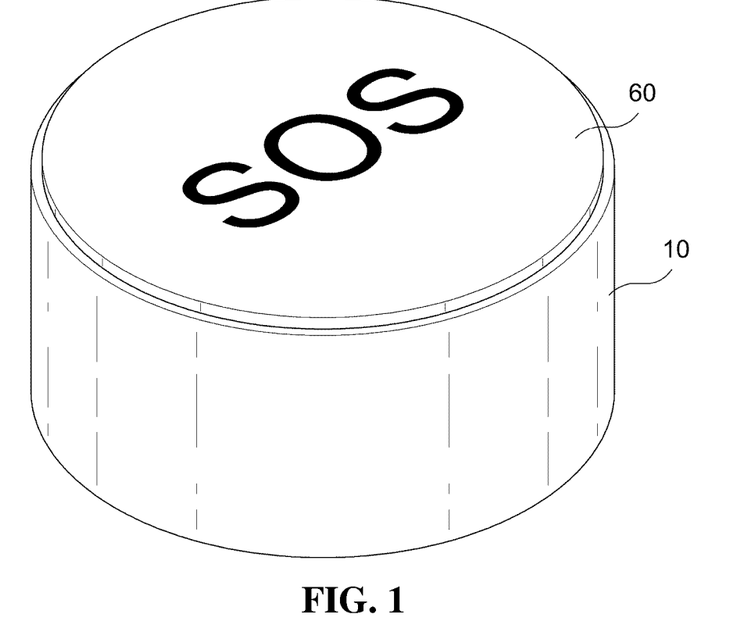
FIG. 1 is a perspective view illustrating an outer shape of an anti-gas kit according to a first embodiment of the present disclosure.
Figure 2:
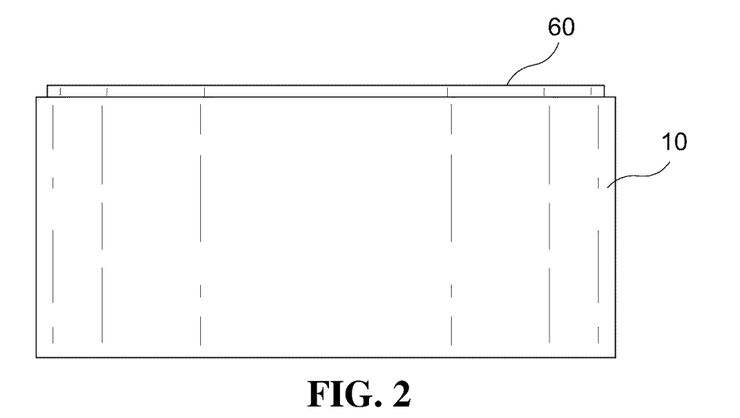
FIG. 2 is a side view of the anti-gas kit according to the present disclosure.
Figure 3:
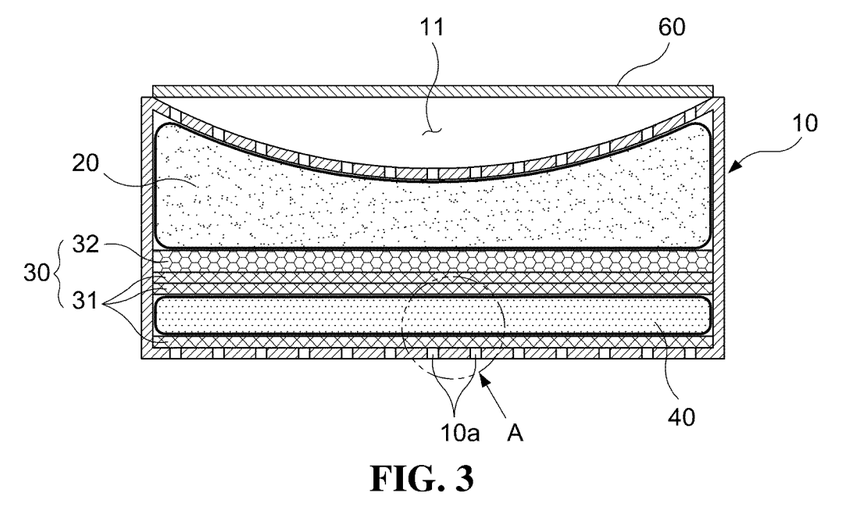
FIG. 3 is a cross-sectional view of the anti-gas kit according to the present disclosure.
Figure 4:
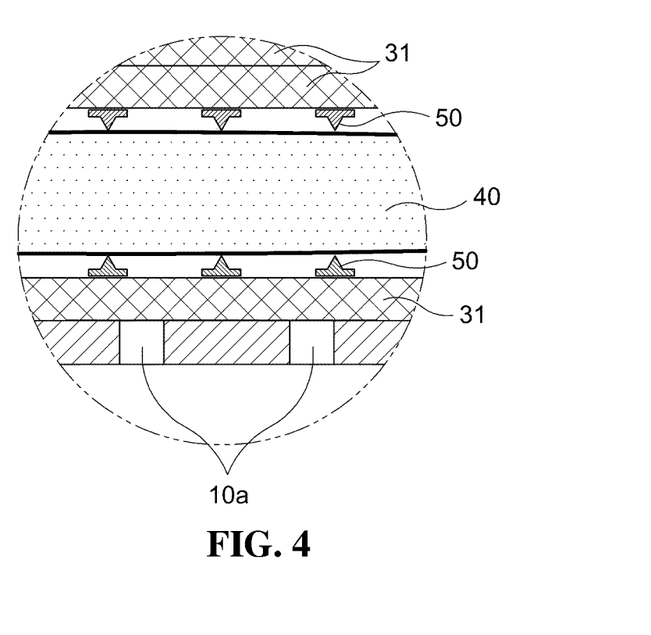
FIG. 4 is an enlarged view of the portion A in FIG. 3.

In particular, the nonwoven fabric layer 30 may include a first nonwoven fabric layer 31 provided as a single fold or a plurality of folds for first trapping of particles of toxic gas and a second nonwoven fabric layer 32 finer than the first nonwoven fabric layer 31.

The respiratory organ contact portion 11 may have the shape of a concavely curved surface or a planar surface.

In addition, air holes 10a allowing air to flow therethrough are formed in the top surface and the bottom surface of the body 10.

In addition, a cover 60 is detachably mounted on the body 10 using an adhesive tape or in a fitting manner. The cover 60 preventing the respiratory organ contact portion 11 from being exposed externally such that foreign matter is not absorbed to and does not contaminate the respiratory organ contact portion 11.

Effects obtained due to the use of the anti-gas kit having the above-described configuration according to the present disclosure will be described.

The anti-gas kit according to the present disclosure has a small size so as to be carried in a simple manner. When toxic gas is produced due to a fire or the like, the anti-gas kit is used by detaching the cover 60 and then bringing the anti-gas kit into close contact with a respiratory portion of a user.

That is, at this time, the water tube 40 is perforated using the cutting members 50 by applying impact to or pressing the body 10 so that water permeates into and is absorbed to the nonwoven fabric layer 30.

Figure 5:
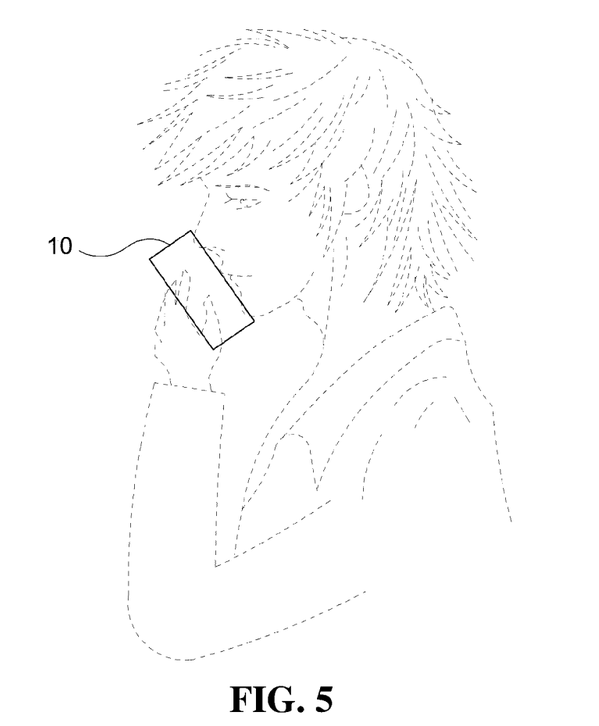
FIG. 5 is a view of an application of the anti-gas kit according to the present disclosure.

Afterwards, when the respiratory organ contact portion 11 of the body 10 is brought into close contact with the respiratory portion as illustrated in FIG. 5, air entering through the air holes 10a is purified of toxic gas while passing through the first nonwoven fabric layer 31, the second nonwoven fabric layer 32, and the active carbon layer 20.

In particular, water absorbed to the first and second nonwoven fabric layers 31 and 32 may improve the efficiency of toxic matter purification by wet filtration.

Accordingly, the anti-gas kit according to the present disclosure may be easily carried so as to be rapidly used in an emergency, such as a fire. In addition, wet gas filtration may be performed using the water tube to more effectively block toxic gas from entering the respiratory system, thereby minimizing casualties.

Figure 6:
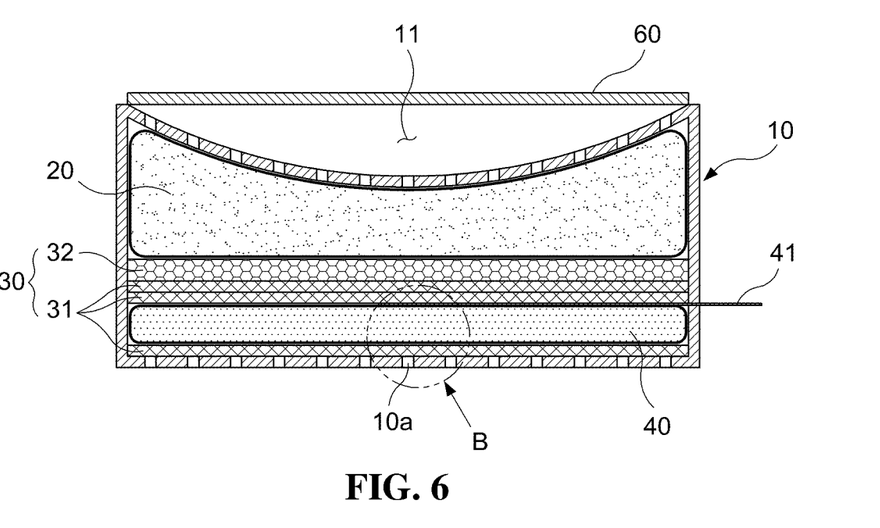
FIG. 6 is a cross-sectional view illustrating an anti-gas kit according to a second embodiment of the present disclosure.
Figure 7:
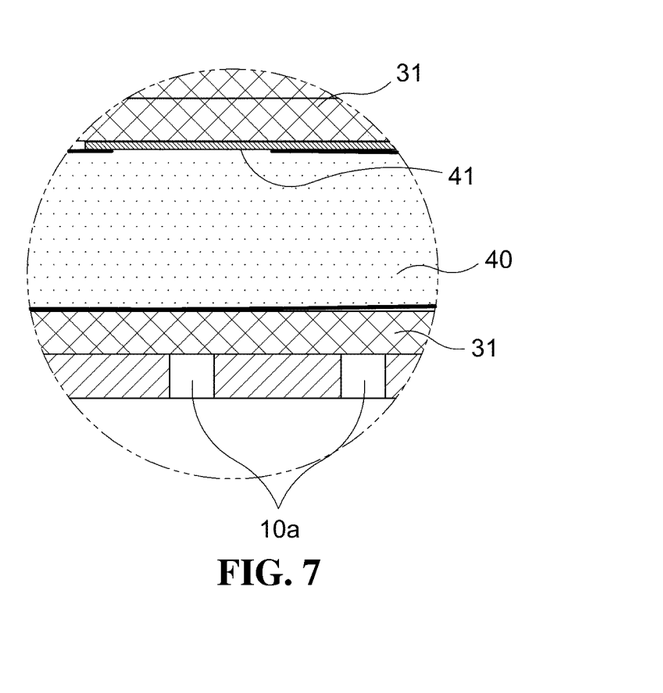
FIG. 7 is an enlarged view of the portion B in FIG. 6.
Figure 8:
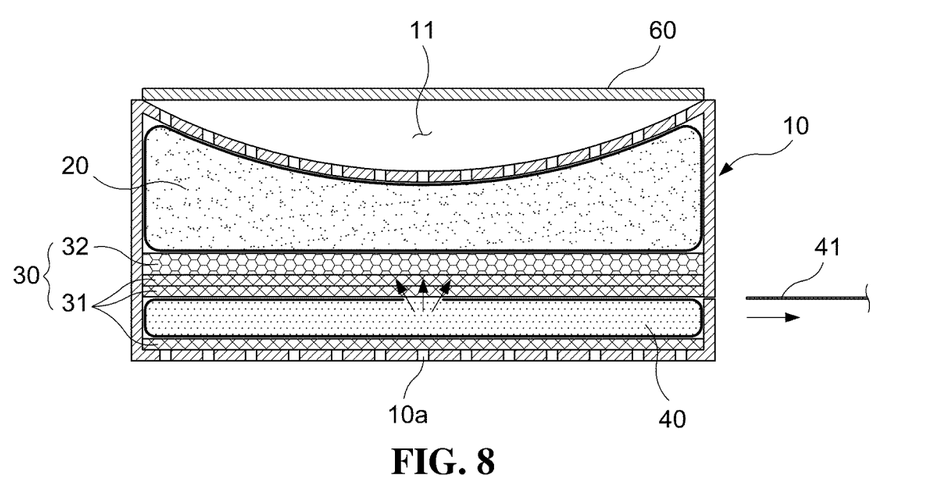
FIG. 8 is a view illustrating an operation state of the anti-gas kit according to the second embodiment of the present disclosure.

FIGS. 6 to 8 illustrate a configuration according to a second embodiment of the present disclosure. Referring to FIGS. 6 to 8, a sticker 41 for opening and closing a water container is attached to the water tube 40. A grip (or a handle of) the sticker 41 is exposed toward one side of the body 10.

According to this configuration, in an emergency, such as a fire, when the sticker 41 is detached from the water tube 40 by drawing the grip of sticker 41, water contained in the water tube 40 may be discharged from the water tube 40 and be absorbed to the nonwoven fabric layer 30.

Accordingly, this configuration may enable the opening of the water tube 40 without the use of a sharp component, such as the cutting members 50, thereby preventing an accident, such as injury, due to the cutting members 50 during the use of the anti-gas kit.

Figure 9:
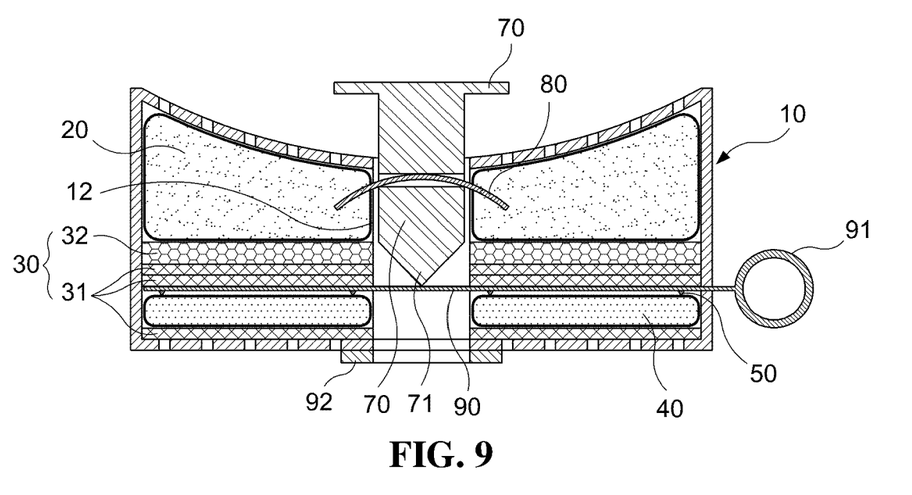
FIG. 9 is a cross-sectional view illustrating an anti-gas kit according to a third embodiment of the present disclosure.
Figure 10:
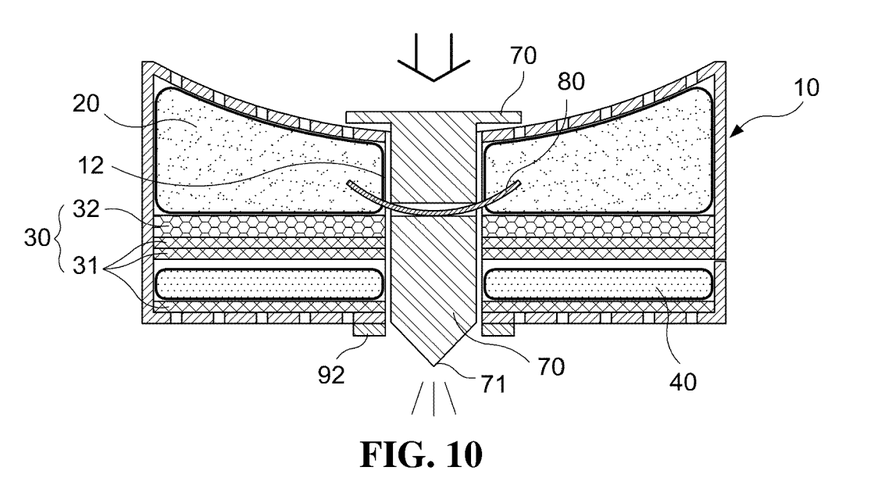
FIG. 10 is a view illustrating an operation state of the anti-gas kit according to the third embodiment of the present disclosure.

In addition, FIGS. 9 and 10 illustrate a configuration according to a third embodiment of the present disclosure. Referring to FIGS. 9 and 10, a center through-hole 12 is formed in the central portion of the body 10, and an impact member 70 having a pointed portion 71 on the distal end to break tempered glass is fitted into the center through-hole 12. The impact member 70 is supported by a leaf spring 80 having a predetermined curvature shape, and a movable portion 72 applying percussion force is integrally provided on the rear portion of the impact member 70.

In addition, a protection plate 90 preventing injury due to the pointed portion 71 of the impact member 70 is provided on the leading end portion of the center through-hole 12. A safety pin 91 allowing the protection plate 90 to be removed is provided on one side of the protection plate 90. Glass surface adhesion is enabled by an adhesive layer 92 provided on one side of the body 10.

According to this configuration, when a user is trapped in a vehicle or a building, the user may escape by breaking tempered glass using the impact member 70.

In this case, when the user applies impact tempered glass by pressing the movable portion 72 after attaching the body 10 to the tempered glass using the adhesive layer 92, instantaneous elastic force of the leaf spring 80 in addition to the force applied from the movable portion 72 is transferred to the impact member 70.

Accordingly, the impact member 70 is driven forward by strong elastic force so that the pointed portion 71 strikes the tempered glass, thereby breaking the tempered glass, so that the user may rapidly escape.

The invention claimed is:

1. An emergency anti-gas kit comprising:
   a body having a respiratory organ contact portion configured to be in contact with a respiratory portion of a user;
   an active carbon layer, a nonwoven fabric layer, and a water tube provided in the body, the water tube containing water; and
   pin or blade-shaped cutting members allowing the water contained in the water tube to be discharged and absorbed to the nonwoven fabric layer due to external pressurization,
   wherein air holes are formed in top and bottom surfaces of the body to allow air to flow therethrough,
   wherein a center through-hole is formed in a central portion of the body,
   wherein the emergency anti-gas kit further comprises an impact member having a pointed portion on a distal end thereof to break tempered glass, and
   wherein the impact member is fitted into the center through-hole and is supported by a leaf spring having a predetermined curvature shape, and a movable portion applying percussion force is integrally provided on a rear portion of the impact member.

2. The emergency anti-gas kit of claim 1, wherein a cover is detachably mounted on the body, and wherein the cover prevents the respiratory organ contact portion from being exposed externally such that foreign matter is not absorbed to and does not contaminate the respiratory organ contact portion.

3. The emergency anti-gas kit of claim 1, wherein the nonwoven fabric layer includes a first nonwoven fabric layer for first trapping of particles of toxic gas and a second nonwoven fabric layer finer than the first nonwoven fabric layer.

4. The emergency anti-gas kit of claim 1, further comprising a protection plate preventing injury due to the pointed portion of the impact member is provided on a leading end portion of the center through-hole, wherein a safety pin is provided on one side of the protection plate and allows the protection plate to be removed, and an adhesive layer is provided on one side of the body to enable glass surface adhesion.

5. An emergency anti-gas kit comprising:
   a body having a respiratory organ contact portion configured to be in contact with a respiratory portion of a user; and
   an active carbon layer, a nonwoven fabric layer, and a water tube provided in the body, the water tube containing water,
   wherein a grip portion of a sticker is attached to the water tube to be exposed toward one side of the body, such that, when the sticker is detached from the water tube by drawing the grip of the sticker, the water contained in the water tube is discharged from the water tube and is absorbed to the nonwoven fabric layer, and
   air holes are formed in top and bottom surfaces of the body to allow air to flow therethrough,
   wherein a center through-hole is formed in a central portion of the body,
   wherein the emergency anti-gas kit further comprises an impact member having a pointed portion on a distal end thereof to break tempered glass, and wherein the impact member is fitted into the center through-hole and is supported by a leaf spring having a predetermined curvature shape, and a movable portion applying percussion force is integrally provided on a rear portion of the impact member.

6. The emergency anti-gas kit of claim 5, wherein a cover is detachably mounted on the body, and wherein the cover prevents the respiratory organ contact portion from being exposed externally such that foreign matter is not absorbed to and does not contaminate the respiratory organ contact portion.

7. The emergency anti-gas kit of claim 5, wherein the nonwoven fabric layer includes a first nonwoven fabric layer for first trapping of particles of toxic gas and a second nonwoven fabric layer finer than the first nonwoven fabric layer.

\* \* \* \* \*